United States Patent Office 3,776,841
Patented Dec. 4, 1973

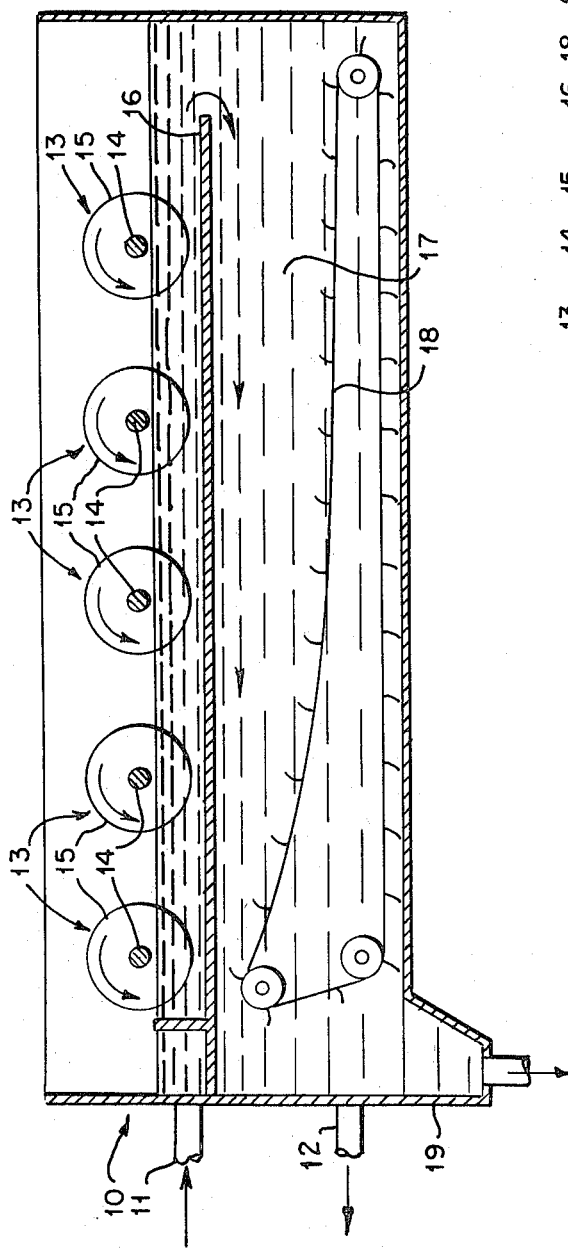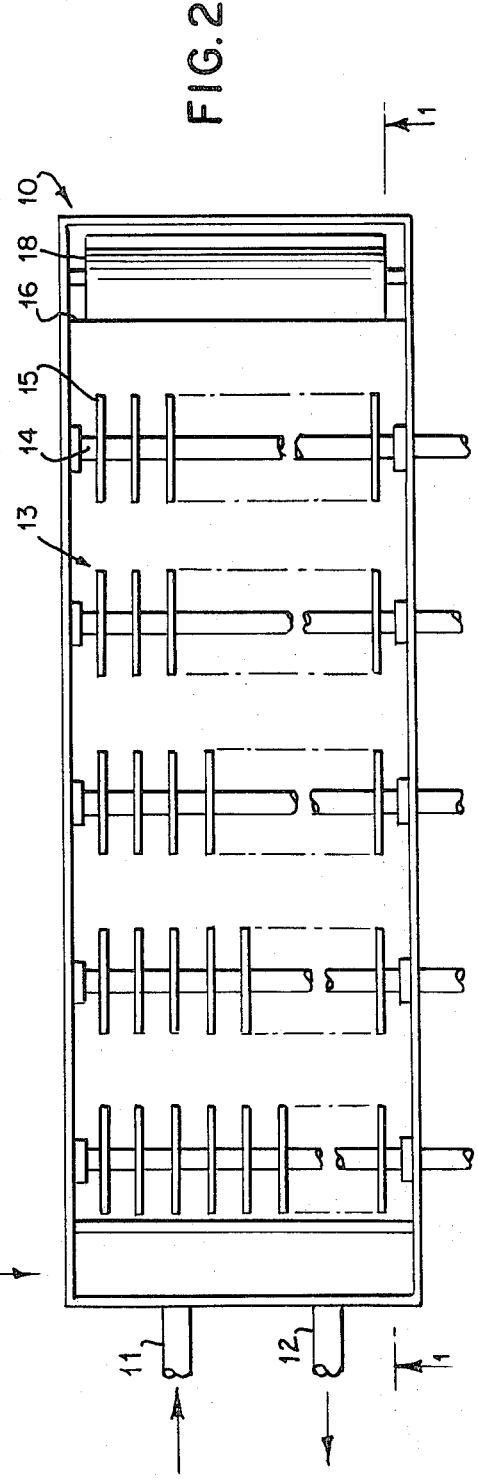

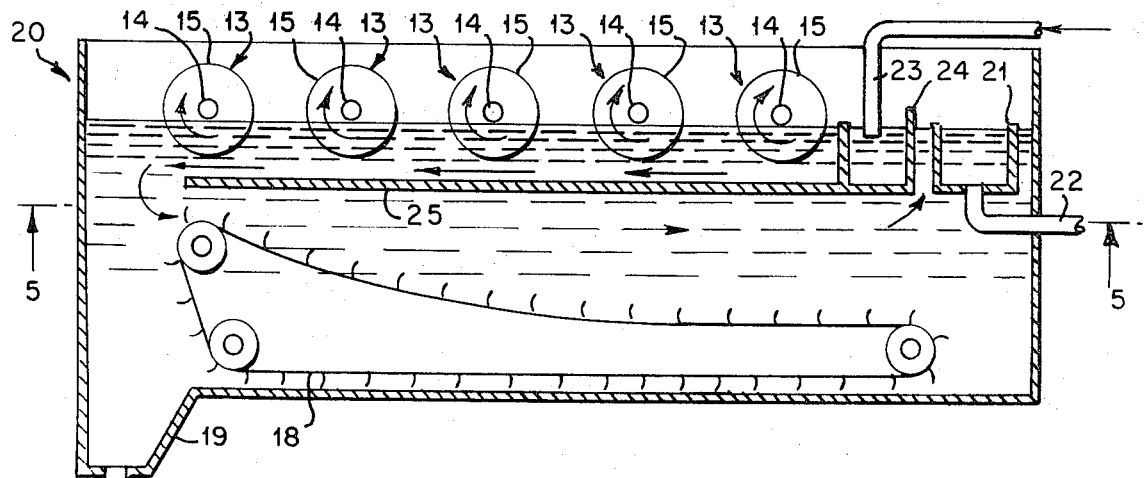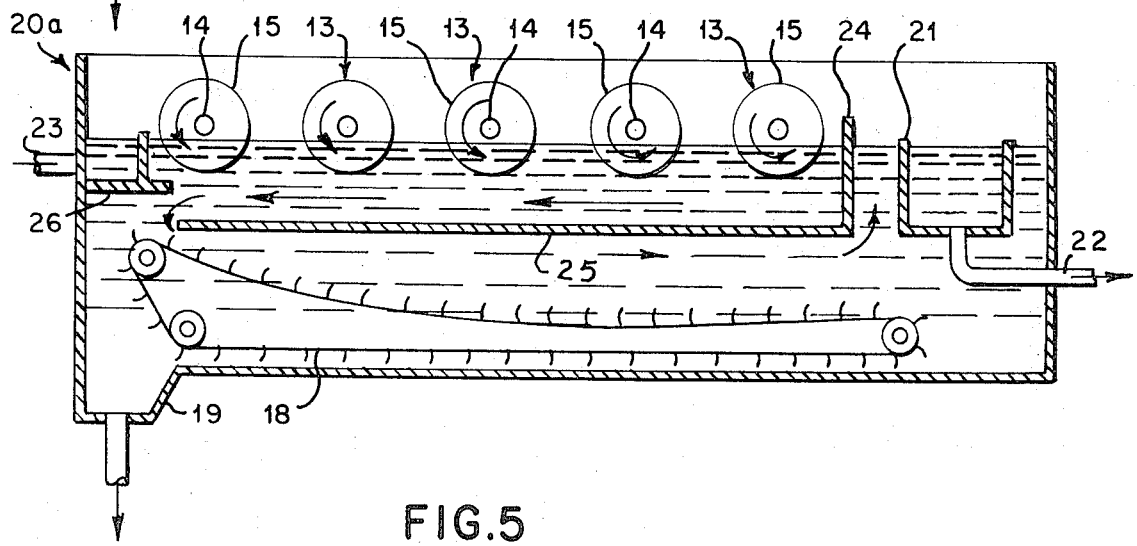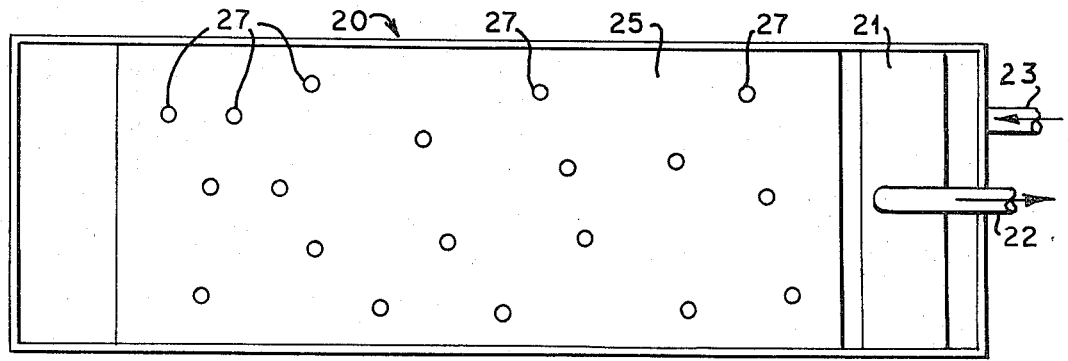

3,776,841
METHOD AND APPARATUS FOR THE BIOLOGICAL TREATMENT OF WASTE WATER
Wilbur N. Torpey, Douglaston, N.Y., assignor to Autotrol Corporation, Milwaukee, Wis.
Continuation-in-part of application Ser. No. 122,618, Mar. 1, 1971, now Patent No. 3,703,238, which is a division of application Ser. No. 781,452, Dec. 5, 1968, now Patent No. 3,575,849. This application Nov. 15, 1972, Ser. No. 306,584
Int. Cl. C02c 1/04
U.S. Cl. 210—17         12 Claims

ABSTRACT OF THE DISCLOSURE

Method and apparatus for substantially upgrading the operating efficiency of waste water treatment plants is disclosed. The invention utilizes forcibly rotating bodies that are partially submerged in the waste water to provide surface area on which biological slimes develop and serve the purpose of removing pollutants from the waste water. The rotating, partially submerged bodies are located in the upper portion of the treatment tanks, to provide a biological treatment zone. A subjacent settling zone, physically separated from the biological treatment zone by a "false bottom" or longitudinal baffle is provided in the lower portion of the treatment tank. Waste water introduced in the tank is first biologically treated and then circulated through the subjacent settling zone to remove settleable solids.

RELATED APPLICATIONS

This application is a continuation-in-part of copending application Ser. No. 122,618, filed Mar. 1, 1971, now U.S. Pat. 3,703,238, which is a divisional of Ser. No. 781,452, filed Dec. 5, 1968 and now U.S. Pat. 3,575,849. The disclosure of U.S. Pat. 3,575,849 is herein incorporated by reference.

BACKGROUND OF THE INVENTION

The present invention pertains to the biological treatment of waste water. More specifically, the invention provides improved method and apparatus for removing pollutants from waste water by biological activity.

The aforementioned U.S. Pat. 3,575,849 issued to the applicant herein discloses a method and apparatus for biologically treating waste water including a treatment tank having a biological treatment zone in its upper portion and a quiesent settling zone in its lower portion. The biological treatment zone includes a plurality of parallel rotatable shafts disposed across the upper portion of the tank; each of the shafts supporting a plurality of biological contactors, typically thin discs. The contactors extend into the waste water in the tank to less than half the tank depth, providing a subjacent settling zone for sloughed off solids. The surface of the biological contactors is alternately exposed to the atmosphere and waste water at suitable intervals to promote the growth of aerobic biological slimes.

The present invention provides an improved waste water treatment tank employing a biological treatment zone, including rotating biological contactors in its upper portion and a settling zone for solid materials sloughed off the contactors and present in the waste water in its lower portion.

The settling zone in accordance with the invention is disposed beneath the biological contactors and is physically separated from the biological treatment zone by a longitudinal baffle which forms a "false bottom" for the biological treatment zone. The longitudinal baffle extends the full width of the tank, from one end to substantially the full length of the tank.

Waste water entering the improved treatment tank is forced through the biological treatment zone aided by the pumping effect of the rotating contactors which are preferably rotated in a direction such that the velocity component of the peripheral velocity at the lowermost portion of the contactors is in the direction of waste water flow through the biological treatment zone. Rotating the contactors in the preferred direction also results in carrying forward any solids settled out of the waste water in the biological treatment zone, thereby preventing solid buildup and additional maintenance requirements for the unit.

From the biological treatment zone, substantially all, usually 100% of the biologically treated waste water is forced around the longitudinal baffle, which forms a false bottom for the biological treatment zone, and through the settling zone. Solid materials sloughed off the contactors are carried into the subjacent settling zone and settled to the bottom of the tank from which they are collected and removed. The waste water removed from the settling zone has been biologically treated to remove up to about 95% of carbonaceous matter measured as B.O.D. (biological oxygen demand) depending on contactor surface provided per volume (gallons per day) of waste water, and is substantially free from suspended solids and suitable for direct discharge in a receiving body of water, e.g., lakes, streams, rivers, etc.

The primary advantage of the improved treatment tank of the invention is that 100% of the supplied waste water is subjected to aerobic biological activity in the biological treatment zone. Further, virtually all, usually 100% of the biologically treated waste water is forced through the subjacent settling zone which, because of its physical separation from the rotating contactors is quiesent and capable of a high removal of suspended solids. The improved apparatus and method of the invention results in a consistant removal of carbonaceous pollutants from the waste water with a minimum spillover of suspended solids thereby eliminating the need for subsequent solids removal apparatus.

BRIEF DESCRIPTION OF THE DRAWING

The invention will now be more specifically described with reference to the drawings, wherein FIG. 1 is a diagrammatic cross-sectional view of an apparatus in accordance with the invention taken along line 1—1 of FIG. 2;

FIG. 2 is a diagrammatic plan view of an apparatus according to the invention;

FIGS. 3 and 4 are diagrammatic cross-sectional elevational views of alternate embodiments of the improved apparatus;

FIG. 5 is a diagrammatic bottom plan view taken along line 5—5 of FIG. 3.

PREFERRED EMBODIMENTS

Referring to FIGS. 1 and 2 of the drawing, a tank unit 10 having a waste water inlet 11 and treated waste water outlet 12 is shown. The tank 10 can be either a primary settling tank, secondary settling tank or the complete clarification unit of an existing or new waste water treatment plant. The waste water supplied to the tank 10 can be either raw or partially treated, e.g., presettled, domestic or industrial waste water containing biochemically oxidizable pollutants.

The upper portion of tank 10 contains a biological treatment zone including a plurality of parallel biological contactor assemblies 13, shown as thin discs, which include a plurality of rotatably mounted shafts 14. Each shaft 14, in turn supports a plurality of concentrically and fixedly mounted discs 15, which provide surface area upon which biological slimes may grow. The shafts 14 are preferably mounted above the usual level of waste water in the tank unit to simplify mechanical construction, although submergence of the discs 15 can be varied from about ⅓ to ⅔ of their diameter.

Although the rotatable biological contactors of the invention may take different forms such as drums, cylinders, brushes or thin, closely spaced discs, it is preferred to use contactors having a discontinuous honeycomb type structure such as that disclosed in pending U.S. application Ser. No. 252,038, filed May 10, 1972. Thin discs are also advantageous biological contactors since they facilitate a high concentration of surface area per unit volume of biological treatment zone and can be used to impart a pumping effect to the waste water. Suitable biological contactors can be constructed of many available materials, although plastics and lightweight metals are generally preferred.

Driving means (not shown) are provided to rotate shafts 14 to impart a predetermined peripheral velocity to the discs 15. Advantageously the driving means are capable of imparting rotational forces to shafts 14 variable in magnitude and direction. This allows for the accommodation of varying waste water flow rates through the tank 10 and provides for the mechanical removal of excessive slime growth from the surface of discs 15, when and if desired. Preferably the directional component of the peripheral velocity of the discs at their lowermost portion is in the direction of waste water flow through the biological treatment zone.

The tank 10 is divided into two vertically adjacent treatment zones, physically separated by longitudinal baffle 16. The upper portion of the tank unit 10 encompassing the rotating disc assemblies 13 is operated to perform the biological function. The lower portion of tank 10 between the baffle 16 and the bottom of the tank is a subjacent sedimentation zone, generally indicated by the numeral 17, for the settling of excess slimes from the flow of waste water being treated. Typically, a sludge collection mechanism 18 is provided at the bottom of the tank to remove the settled slime to a sump 19 for withdrawal to subsequent disposal (not shown). The sludge collection mechanism 18 can be chosen from those presently in widespread use.

In accordance wth a specific aspect of the invention, the longitudinal baffle 16, which forms a false floor for the biological treatment zone, extends across the full width of the tank 10 and along substantially all, typically 85–95%, of the long dimension of the tank. A sufficient space between the end of the baffle 16 and the far wall of tank 10, to permit the biologically treated waste water to reverse direction and flow through the subjacent settling zone countercurrently to the flow direction through the biological treatment zone, is provided. The downward velocity of the waste water as it flows from the upper zone to the lower zone should be from about 3 to 15 feet per minute.

Further, pursuant to the invention, the distance between the lower edge of the discs 15 and the longitudinal baffle 16 is typically between about 2 inches and about 3 or 4 feet depending on the quality of the waste water supplied through inlet 11. When presettled waste water, substantially free of sand and solid pollutants, is supplied, the baffle 16 can be located very close, usually from about 2 to 6 inches to the bottom of the discs since the accumulation of solids on the top surface of the baffle will be minimal. Further, by rotating the discs so that their lowest portion has a directional velocity in the direction of wastewater flow, as indicated by the arrows in FIG. 1, accumulated solids are forced over the edge of the baffle 16 and into the subjacent settling zone where they are collected and removed through sump 19.

When raw waste water is supplied to the biological treatment zone, a larger space should be provided between the bottom of the discs 15 and baffle 16 to prevent settled solids from significantly impairing flow through the biological treatment zone. Advantageously, when raw waste water is supplied to the biological treatment zone a solids removal mechanism, similar to that shown in the settling zone of tank 10 and indicated by numeral 18, can be provided. When such a mechanism is desired in the biological treatment zone, the spacing between the discs 15 and baffle 16 should be at least three feet.

In further accordance with the invention, longitudinal baffle 16 can be provided with a regular or random distribution of perforations 27. As shown in FIG. 5, perforations 27 permit settleable solids, typically sand, in the entering waste water to pass from the biological treatment zone to the settling zone without accumulating to a substantial degree on the top of baffle 16. Perforations 27 eliminate the need for a solids removal mechanism beneath the discs 15 and permit the baffle 16 to be located within 2 to 6 inches of the discs when solids containing waste water is processed according to the invention. Pursuant to this aspect of the invention, perforations 27 are from about 1 to about 12 inches in diameter, preferably 3 to 6 inches, and comprise a cumulative cross-sectional area of about 2% to about 5% of the transverse flow area for the waste water through the biological treatment zone, i.e., the product of the width of the tank and the immersion depth of the discs 15.

Referring now to FIGS. 3 and 4, treatment tanks 20 and 20a incorporating the principles of the invention are shown. Tanks 20 and 20a are typically existing primary or secondary settling tanks in a waste water treatment plant which include an overflow weir 21 and outlet conduit 22, for the removal of treated waste water.

As shown in FIGS. 3 and 4, vertical baffle 24 is disposed adjacent weir 21 to vertically separate the biological treatment and settling zones of tanks 20 and 20a. Longitudinal baffle 25 horizontally separates the upper biological treatment zone from the subjacent settling zone extends across the full width of tanks 20 and 20a and along from about 85 to about 95% of the distance from the vertical baffle 24 to the opposite side. A sludge removal mechanism 18 and sump 19 are provided in the settling zones of both tanks 20 and 20a for the collection and removal of settled solids.

Treatment tank 20 employs waste water inlet and outlet means 23, 22 disposed on the same side of the tank resulting in countercurrent waste water flow in the biological treatment zone and subjacent settling zone, as indicated by the arrows in FIG. 3. The tank 20 is similar in operation to tank 10 of FIGS. 1 and 2 and represents an adaptation of the principles of the invention to provide an existing settling tank with a biological treatment function.

Similarly, tank 20a of FIG. 4 can be an existing settling tank incorporating the principles of the invention to substantially upgrade its pollutant removing efficiency. Tank 20a employs a waste water inlet 23 disposed on the opposite side of the tank from the outlet weir 21. Longitudinal baffle 25 is spaced a sufficient distance, typically 1 to 3 feet, from the bottom of discs 15 to permit a back-flow of waste water as indicated by the arrows in FIG. 4. The discs 15 of tank 20a are rotated to have a velocity directional component in their lower portion in the direction of waste water flow through the disc assemblies 13. Inlet baffle 26 is provided to direct incoming waste water through the disc assemblies 13. As in tanks 10 and 20, waste water flow beneath the discs 15 in tank 20a is countercurrent to waste water flow in the subjacent settling zone.

It is preferred to limit the immersion depth of discs 15 to less than one-half the depth of the treatment tank 10, 20 or 20a. For practical purposes the diameter of discs 15 will be between about 6 to 15 feet and immersion depth less than half of the diameter.

To encourage the growth of biological slimes by alternately immersing them in the waste water and exposing them to the atmosphere, the disc assemblies 13 are rotated at a suitable predetermined velocity. From a practical standpoint, the peripheral velocity of the discs should not exceed about 3 feet a second, and must be sufficiently high to avoid excessive immersion of the biological slimes. To provide the microorganisms in the slime with oxygen sufficient to satisfy their metabolic processes, the immersion time of the slimes typically should not exceed about 10 seconds. As the waste water becomes progressively clarified the immersion time of the slimes can be increased gradually to about 30 seconds. For smaller discs the peripheral velocity can be reduced substantially while avoiding excessive immersion time, while the larger diameter discs usually require that the rotational velocity be substantially increased to avoid excessive immersion time. Therefore, the peripheral velocity of the discs 15 for normal operation should be between about 0.5 and 3 feet per second, preferably from about 0.75 to 1.5 feet per second.

In accordance with the invention, the discs 15 should be spaced as close as practicable on shafts 14 in order to obtain maximum concentration of disc surface area per unit volume of disc assembly. However, allowance must be made for adequate contact time of the waste water with the 1/16 inch to 1/4 inch thick slimes that develop on the disc surfaces. With these considerations in mind, the discs 15 should be spaced at least 1/2 inch on centers. A disc spacing of from about 3/4 to 1 1/2 inches on centers has been found to be suitable when treating normal domestic waste water.

In operation, it should be realized that waste water treatment plants are subject to diurnal variations in flow. During the early morning hours, from about 2 a.m. and 6 a.m. the flow of waste water to the plant can be and usually is a small fraction of that during daytime periods. In order to adapt the biological treatment plant of the invention to these variations in waste water flow, an automatic control system can be provided to control the peripheral velocity of the discs to accommodate changes in flow rate without excessive recirculation.

The method and apparatus of the invention provides a relatively inexpensive and practical means for substantially upgrading waste water treatment plants. The invention can be applied to primary sedimentation tanks, which remove only the settleable solids from the raw waste water. A large portion of the B.O.D. that would remain can be removed at a relatively small cost. Treatment plants that are presently removing from 30–60% of the B.O.D. in the waste water can be upgraded economically to remove from 80–99% of B.O.D. pollutants by applying the principles of the invention to the plant.

The removal of carbonaceous pollutants is a function of the loading rate, e.g., gal./day/sq. ft. of contactor area and the quality of the waste water. A 90% B.O.D. removal can be effected with a loading rate of 2 to 5 gal./day/sq. ft. of contactor surface for normal waste water and 80% B.O.D. removal with a loading rate from 4 to 10 gal./day/sq. ft. When an oxygen enriched atmosphere is provided above to biological treatment zone, i.e., about 40 to 70% oxygen, 90% B.O.D. removal can be accomplished with a loading rate from 4 to 10 gal./day/sq. ft.

In addition to substantially upgrading existing waste water treatment plants, the method and apparatus of the invention can be the basis for new plant design. A single tank waste water treatment plant capable of removing over 90% of B.O.D. from waste water can be provided at a fraction of the cost of a conventional activated sludge or a trickling filter plant effecting the same degree of clarification.

It should be understood that the method and apparatus of the invention have been described in relation to specific applications for illustrative purposes only. The term longitudinal baffle should be read to include any horizontally disposed baffle that folds the waste water flow between a biological treatment zone and a subjacent settling zone. Variations and modifications of the examples can be made without departing from the clear teachings and spirit of the invention. For example, the principles of the invention could be applied to a round tank having an upper biological treatment zone and subjacent settling zone separated by a horizontal baffle. Accordingly, reference should be made to the following appended claims in determining the full scope of the invention.

What is claimed is:

1. Method for continuous treatment of waste water comprising
   (a) providing a treatment tank having a biological treatment zone in its upper portion and a subjacent settling zone,
   (b) providing a horizontally disposed physical barrier between said settling zone and biological treatment zone,
   (c) said biological treatment zone including a plurality of rotatably mounted parallel shafts mounted across said tank transverse to the direction of waste water flow and a plurality of partially submerged contactor members mounted on each of said parallel shafts,
   (d) introducing waste water into said biological treatment zone,
   (e) creating a flow of substantially all of said waste water through said biological treatment zone,
   (f) circulating substantially all of said waste water around said physical barrier from said biological treatment zone into said subjacent settling zone,
   (g) creating a flow of all of said waste water introduced into said biological treatment zone through said settling zone in a direction counter to the direction of waste water flow through said biological treatment zone,
   (h) rotating said contactor members at a peripheral velocity adequate to permit the growth of aerobic biological slimes on the surface of said contactor members, and
   (i) removing said waste water from said settling zone.

2. The method according to claim 1, wherein said waste water is introduced into said biological treatment zone and removed from said settling zone at the same end of said treatment tank.

3. The method according to claim 1, wherein the directional component of said peripheral velocity at the lowermost submerged portion of said contactor members is in the direction of waste water flow through said biological treatment zone.

4. A treatment tank for the continuous biological treatment of waste water comprising,
   (a) a tank structure having a substantial length dimension and a width dimension smaller than said length dimension,
   (b) inlet means for introducing waste water into said tank structure,
   (c) outlet means for removing waste water from said tank structure,
   (d) said inlet and outlet means being adjacently disposed at one end of said length dimension,
   (e) a plurality of parallel rotatable shafts extending across said tank, transverse to said length dimension,
   (f) a plurality of contactor members having a predetermined diameter mounted on each of said shafts,
   (g) said contactor members being partially submerged in said waste water during operation of said tank to more than one-third and less than two-thirds of said predetermined diameter,
   (h) means for forceably rotating said shafts to impart a predetermined peripheral velocity to said contactor members,
   (i) said predetermined peripheral velocity being suitable for the growth of aerobic biological slimes on the surface of said contactor members during operation, (j) a longitudinal baffle extending across said width dimensions and along a substantial portion of said length dimension, (k) said longitudinal baffle horizontally disposed beneath said contactor members, and separating said tank into upper and lower sections communicating at the opposite end of said length dimension from said one end, and (l) means cooperating with said longitudinal baffle for preventing waste water from entering said biological treatment zone from said settling zone at said one end of said length dimension.

5. The apparatus according to claim 4, wherein the distance between the periphery of said contactor members and said longitudinal baffle is from 2 to about 6 inches.

6. The apparatus according to claim 4, wherein said longitudinal baffle extends from one side of said tank to from about 85 to 95% of said length dimension.

7. A treatment tank according to claim 4, wherein said longitudinal baffle includes a plurality of perforations each having a diameter from about 1 to about 12 inches.

8. A treatment tank according to claim 7, wherein the cumulative cross-sectional area of said perforations is from 2% to about 5% of the waste water transverse flow area measured as the product of said width and the immersion depth of said contactor members.

9. A treatment tank according to claim 8, wherein said perforations are from 3 to 6 inches in diameter.

10. In an apparatus for the treatment of waste water including a tank structure having predetermined length and width dimensions, a biological treatment zone in its upper portion, a settling zone in its lower portion subjacent to and substantially coextensive with said biological treatment zone, inlet means for introducing waste water into said tank structure, outlet means for removing waste water from said tank structure and sludge removal means for removing settled solids from said settling zone, the improvement comprising baffling means disposed between said biological treatment zone and said settling zone, said baffling means including a horizontally disposed longitudinal baffle extending across the full width dimension of said tank and a substantial portion of said length dimension to separate said tank into vertically adjacent biological treatment and settling zones communicating at one end of said length dimension, and means for preventing waste water flow from said settling zone to said biological treatment zone, said baffling means physically directing said waste water, in sequence, from said inlet means through said biological treatment zone, into said settling zone, through said settling zone and to said outlet means, said inlet and outlet means being adjacently disposed at the opposite end of said tank from said one end of said length dimension.

11. The improved apparatus of claim 10, wherein said means for preventing waste water flow from said settling zone to said biological treatment zone includes a vertically disposed baffle extending upwardly from said longitudinal baffle between said inlet and outlet means.

12. The improved apparatus of claim 10, wherein said longitudinal baffle is disposed in a single horizontal plane.

References Cited

UNITED STATES PATENTS

| | | | |
|---|---|---|---|
| 3,563,383 | 2/1971 | Hellquist | 210—151 X |
| 3,335,081 | 8/1967 | El-Naggar | 210—151 X |
| 3,466,241 | 9/1969 | Simpson | 210—151 X |
| 3,428,555 | 2/1969 | Kitagawa et al. | 210—151 X |
| 3,389,798 | 6/1968 | Hartmann et al. | 210—151 X |
| 3,703,462 | 11/1972 | Smith | 210—17 X |
| 3,575,849 | 4/1971 | Torpey | 210—17 X |
| 3,704,783 | 12/1972 | Antonie | 210—17 X |

SAMIH N. ZAHARNA, Primary Examiner

R. H. SPITZER, Assistant Examiner

U.S. Cl. X.R.

210—151, 199, 256